(12) United States Patent
Jones

(10) Patent No.: US 6,457,725 B1
(45) Date of Patent: Oct. 1, 2002

(54) SEPTIC TANK GASKET

(75) Inventor: William D. Jones, Warrington, PA (US)

(73) Assignee: Hail Mary Rubber Company, Warrington, PA (US)

( * ) Notice: Subject to any disclaimer, the term of this patent is extended or adjusted under 35 U.S.C. 154(b) by 0 days.

(21) Appl. No.: 09/805,291

(22) Filed: Mar. 13, 2001

(51) Int. Cl.$^7$ .............. F16L 5/02; F16L 17/00; F16L 25/00; F16L 49/00; E02D 29/14
(52) U.S. Cl. .......... 277/606; 277/616; 277/626; 285/230; 285/921; 52/20
(58) Field of Search .......... 405/52, 53, 55; 52/19, 20, 21, 169.6; 210/532.2; 285/230, 215, 216, 921; 277/602, 604, 607, 608, 616, 626, 606

(56) References Cited

U.S. PATENT DOCUMENTS

| | | | | |
|---|---|---|---|---|
| 2,820,088 A | * | 1/1958 | Sperry | 16/2.1 |
| 2,897,533 A | * | 8/1959 | Bull et al. | 16/2.1 |
| 3,280,323 A | * | 10/1966 | Pawlowski | 174/153 G |
| 3,850,457 A | * | 11/1974 | Bigotte et al. | 285/121 |
| 4,333,662 A | * | 6/1982 | Jones | 277/605 |
| 4,663,036 A | * | 5/1987 | Strobl, Jr. et al. | 210/532.2 |
| 4,772,389 A | * | 9/1988 | Guibault | 16/2.1 |
| 5,071,143 A | * | 12/1991 | Byerly et al. | 174/152 G |
| 5,335,945 A | * | 8/1994 | Meyers | 285/236 |
| 5,655,564 A | | 8/1997 | Gavin | 137/363 |
| 5,711,632 A | * | 1/1998 | Garrahan | 405/52 |
| 5,772,361 A | * | 6/1998 | Gavin | 220/565 |
| 5,979,908 A | * | 11/1999 | Jones | 277/604 |

* cited by examiner

Primary Examiner—Anthony Knight
Assistant Examiner—Vishal Patel
(74) Attorney, Agent, or Firm—Howson and Howson

(57) ABSTRACT

A flexible gasket connecting a plastic or fiberglass pipe in fluid communication with a plastic or fiberglass septic tank. The gasket is an integrally molded elastomer having an annular base with a flange and keeper portions extending radially outward from the base forming a continuous groove sealing around the periphery of an opening in the tank. The keeper portion is tapered axially to enable the gasket to be pushed into the tank opening and snap-fitted into position. A web portion extends inwardly from the middle of the base portion and terminates in a toroidal portion to provide a primary sealing function of the gasket, and the toroidal portion provides a secondary sealing. The added pressure produced by the toroidal portion significantly strengthens the total seal while retaining residual resilience to allow relative movement of the tank and pipe.

6 Claims, 1 Drawing Sheet

SEPTIC TANK GASKET

BACKGROUND OF THE INVENTION

1. Field of the Invention

The present invention relates generally to underground septic systems, and more particularly to a novel and improved flexible gasket for installing and positively sealing a pipe in an opening of a septic tank.

2. Description of the Prior Art

Septic tanks for domestic use are typically constructed of cast concrete, fiberglass or molded plastic. Fiberglass or plastic tanks are sometimes preferred for their chemically inert properties, light weight and ease of installation. Plastic pipes may be sealingly connected around openings in the walls of such tanks by heat fusion, solvent welding, or gluing, depending on the type of materials at the tank-pipe interface. However, unlike properly embedded concrete tanks, underground fiberglass or plastic septic tanks have relatively thin walls and a low weight-to-volume ratio that makes them more susceptible to movement with shifts in soil or changes in the watertable, and eventual dislodging of connected pipes and leakage.

Alternatively, plastic pipes have been be sealed in the openings of plastic tanks by flexible plastic gaskets. For instance, U.S. Pat. No. 4,663,036 to Strobl, Jr. et al. discloses injection-molded plastic seal of a pliable low density polyethylene or polyolefin copolymer, having an annular section with radial ribs that snap-fit into the opening of a plastic septic system drop box. A frustoconical section projecting inwardly from the annular section forms a reduced diameter opening that engages the external surface of a pipe inserted into the drop box. Blade sections at spaced locations about the angular intersection of the annular and frustoconical sections are slanted from radial alignment to provide additional tensioning and stiffening. As the pipe is inserted through the seal, the frustoconical section stretches outwardly to the pipe diameter as the blade sections slant further toward the inner surface of the annular section. Fully inserted, the three portions become highly compressed with substantially no residual resilience. Consequently any movement of the tank relative to the pipe due to any shifting of soil may cause the seal to leak. Such a seal would not meet a user's minimum leakage requirements for a residual resilient connection between the plastic pipe and the tank such as set forth in ASTM Standard Specification C-923. In addition, the molds required for injection molding a seal of such a configuration are relatively complex and inherently expensive.

SUMMARY OF THE INVENTION

Accordingly, it is an object of the invention to provide a novel and improved resilient gasket suitable for use in fiberglass and plastic septic tanks, which positively seals the connection between a plastic septic tank and a plastic pipe against leakage, and which retains a flexible seal under conditions of movement due to shifting soil and changing water table.

Another object of the invention is to provide a septic tank gasket which is easily installed in and existing septic tank, and which is durable and resistant to corrosion.

Still another object is to provide a resilient gasket having a configuration which can be injection molded with a relatively simple and inexpensive mold.

A further object of the invention is to provide a gasket suitable for after-market installation in a septic tank fabricated without an appropriate pipe opening.

These and other objects, novel features and advantages of the invention are accomplished with a flexible gasket configured for connecting a plastic or fiberglass pipe in fluid communication with a plastic or fiberglass septic tank. The gasket is an integrally molded elastomer having an annular base with a flange portion and a keeper portion each extending outwardly from opposite sides forming with the base a continuous groove for sealing around the periphery of the tank opening. The flange portion provides a mass around the outer surface of the opening for adding stability in the gasket as the pipe is being installed; and the keeper portion tapered axially for enabling the gasket to be pushed into the tank opening and snap-fitted into position against the inside surface of the tank wall. A web portion extends inwardly from the middle of the base portion and terminates in a toroidal portion. The web portion provides a primary sealing function of the gasket, and the toroidal portion provides a secondary sealing function. As the pipe is being installed, the web portion is tightly compressed between the base and the outer surface of the pipe, whereas the toroidal portion is pushed inward and resiliently compressed between the outside surface of the pipe and the keeper portion. The added pressure produced by the toroidal portion significantly strengthens the total seal while retaining residual resilience to allow relative movement of the tank and pipe.

The foregoing features and advantages of the invention will be come more apparent from the following description when taken in conjunction with the accompanying drawings.

DESCRIPTION OF THE PREFERRED EMBODIMENT

Figure 4:
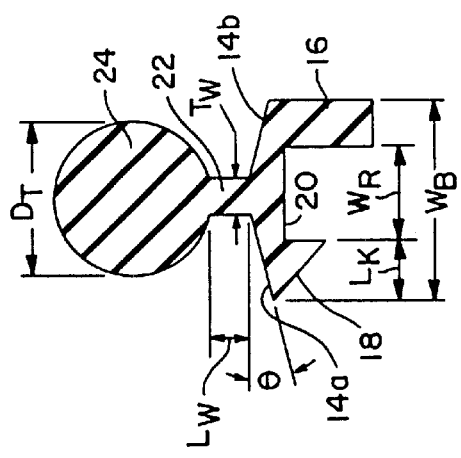
FIG. 4 is a radial cross section of the gasket of FIG. 1.
Figure 1:
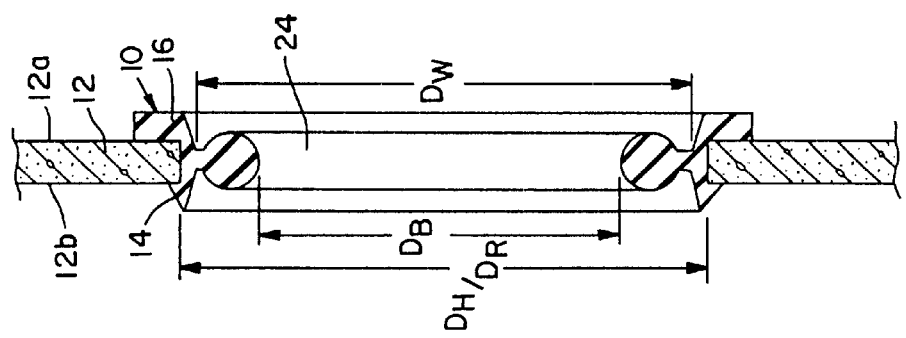
FIG. 1 represents in vertical cross section of an annular gasket according to the invention installed in the wall of a plastic septic tank.

Referring now to the drawings wherein like reference numbers and characters denote like or corresponding parts throughout the several views, FIG. 1 shows a flexible gasket, according to the invention and indicated generally by the numeral 10, installed in a drilled hole of diameter $D_H$ in a relatively thin wall 12 of a septic tank constructed of fiberglass, plastic or like material. As best illustrated in FIG. 4, gasket 10 is injection-molded of a rubber compound into an annular bass portion 14 with a flange portion 16 and a keeper portion 18 each extending radially outward from opposite sides to form a continuous groove 20. The root diameter $D_R$ is substantially the same as the hole diameter $D_H$, and the groove width $W_R$ is selected to compress contiguously against the edge of the opening in wall 12. Flange portion 16 is formed to abut an outer surface 12a of wall 12 and has sufficient mass for adding stability to gasket 10 as a pipe is being installed. Keeper portion 18 is formed to abut an inner surface 12b of wall 12 and tapers axially from groove 20 to length $L_K$ and a diameter sufficient to allow keeper portion 18 to enter the tank opening and snap-fitted into position against inner surface 12b. In a relaxed state, a web portion 22 of thickness $T_W$ and radial length $L_W$ extends inwardly from a mid-region of base 14 and terminates with a toroidal portion 24 of diameter $D_T$ centrally aligned with the length of web portion 22. Base portion 14 has a width $W_B$ with inner and outer shoulders 14a and 14b each diverging from the middle region at an angle θ. The thickness $T_W$ and length $L_W$ of web portion 22, and the diameter $D_W$ at the junction of web portion 22 with base portion 14 are selected to provide the primary sealing pressure at the interface of web portion 22 and pipe 26. The toroidal diameter $D_T$ and inside diameter $D_B$ of toroidal portion 24, and the divergence angle θ of shoulder 14a, are selected to provide an effective secondary sealing pressure at the interface of toroidal portion 24 and pipe 26.

Figure 3:
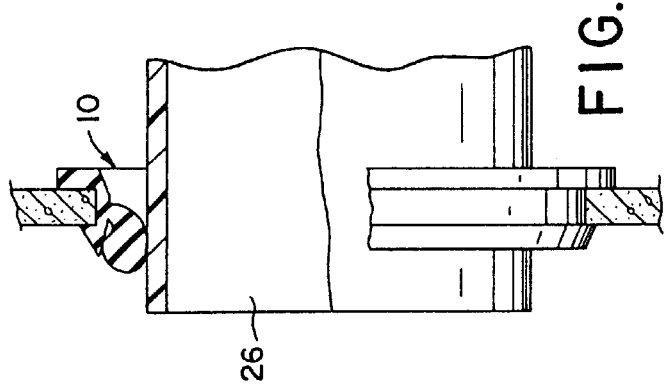
FIG. 3 illustrates the pipe of FIG. 2, with the nose removed, fully inserted in the gasket of FIG. 1
Figure 2:
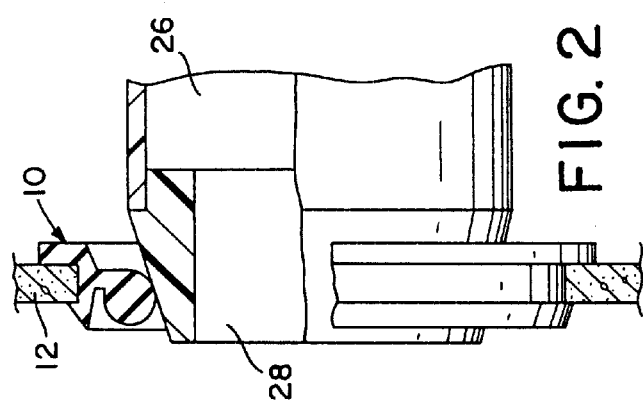
FIG. 2 illustrates a plastic pipe and nose cone attachment partially inserted into the gasket of FIG. 1.

FIGS. 2 and 3 demonstrate that the primary sealing function of gasket 12 is provided by web portion 22, and that the secondary sealing function is provided by toroidal portion 24. FIG. 2 shows a pipe 26 being inserted in gasket 10 with the assistance of a tapered nose cone 28. As nose cone 26 is pushed into the opening of gasket 10, web portion 22 deflects in the same direction and compresses against the outside surface of nose cone 28. FIG. 3 shows pipe 28 after being fully inserted and with nose cone 26 removed. The compression of web portion 22 by the edge of wall 12 and the outer surface of pipe 26 provides the primary sealing function; and the compression of toroidal portion 24 between shoulder 14a and pipe 26 provides the secondary sealing function.

A typical after-market gasket manufactured for sealing a 4" Schedule 40 PVC plastic pipe according to the invention which meets the minimum leakage requirements of Standard Specification of ASTM C-923 for resilient connections between septic tanks and pipes was injection molded of a rubber compound having a hardness of 50 Shore A Durometer with the following dimensions and per cent of pipe outside diameter:

| | | |
|---|---|---|
| pipe outside diameter, $D_P$ | 4.5000" | 100.0% |
| hole and root diameter, $D_H/D_R$ | 5.0000" | 111.1% |
| keeper length, $L_K$ | 0.3125" | 6.9% |
| divergence angle, θ | 3.43° | |
| junction diameter, $D_W$ | 4.8750" | 108.3% |
| web portion thickness, $T_W$ | 0.1875" | 4.2% |
| web portion length, $L_W$ | 0.1875" | 4.2% |
| toroidal portion diameter, $D_T$ | 0.5000" | 11.1% |
| toroidal portion I.D., $D_B$ | 3.5000" | 77.8% |
| base portion width, $W_B$ | 1.0000" | 22.2% |

As shown in per cent of pipe outside diameter in column 3 of the foregoing table, the dimensions of a gasket and the required wall opening vary as a function of the pipe size.

Some of the many advantages and novel features of the invention should now be readily apparent. For instance, a gasket suitable for use in underground fiberglass and plastic septic tanks is now possible which positively seals the connection against leakage between the tank and a plastic pipe. A flexible connection is maintained which will accommodate movement due to shifting soil and changing water table. The gasket can be easily installed in an existing septic tank, is resistant to corrosion, and can be injection molded with a relatively simple and inexpensive mold.

It is understood, of course, that various changes in details, steps and arrangement of parts, which have been herein described and illustrated in order to explain the nature of the invention, may be made by those skilled in the art within the principles and scope of the invention as expressed in the claims appended hereto.

What is claimed is:

1. An improved gasket of integrally molded elastomer for sealing a space around a pipe installed in an opening in a wall having outer and inner sides, comprising:

an annular base portion having inner and outer interior shoulders diverging laterally from a mid-region to respective outer and inner distal ends thereof;

an annular flange portion, extending radially outward from said base portion, formed to abut the outer side of said wall around said opening;

annular keeper means extending radially outward from said base portion and axially spaced from said flange portion to form a continuous groove for sealingly receiving the interior periphery of the wall opening, said keeper means being tapered axially from the outer periphery thereof to the distal end of said inner interior shoulder for snap-fitting against the inner side of the wall when fully inserted in the opening;

annular web means extending radially inward from said mid-region for deflecting in compression against said inner interior shoulder by the installed pipe; and toroidal means of circular shape in radial cross section to the inner periphery of said web means for compression against said inner interior shoulder by the installed pipe.

2. A gasket according to claim 1 wherein said annular web means provides a primary sealing function.

3. A gasket according to claim 2 wherein said toroidal means provides a secondary sealing function.

4. An underground septic system comprising, in combination:

a thin wall septic tank having a wall opening;

a plastic pipe installed in said opening; and an integrally molded elastomeric gasket mounted between said wall opening and said pipe, said gasket having an annular base portion having inner and outer interior shoulders diverging from a mid-region to respective distal ends thereof, an annular flange portion extending radially outward from said base portion abutting the exterior side of the tank around said opening, an annular keeper portion extending radially outward from said base portion and axially spaced from said flange portion to form a continuous groove sealingly receiving the interior periphery of said wall opening, said keeper portion being tapered axially from said distal end of said inner interior shoulder for snap-fitting against the interior side of said tank around said opening when fully inserted, an annular web portion extending radially inward from said mid-region for deflecting in compression against said inner interior shoulder by the installed pipe, and a toroidal portion of circular shape in radial cross section at the inner periphery of said web portion for compressing against said inner interior shoulder by the installed pipe.

5. A septic system according to claim 4 wherein said annular web portion provides a primary sealing function.

6. A septic system according to claim 5 wherein said toroidal portion provides a secondary sealing function.

* * * * *